United States Patent
Kasahara

(10) Patent No.: US 8,854,421 B2
(45) Date of Patent: Oct. 7, 2014

(54) IMAGE PROCESSING APPARATUS AND ON-VEHICLE CAMERA APPARATUS

(75) Inventor: Ryosuke Kasahara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 454 days.

(21) Appl. No.: 12/998,998

(22) PCT Filed: Dec. 10, 2009

(86) PCT No.: PCT/JP2009/071008
§ 371 (c)(1),
(2), (4) Date: Jun. 22, 2011

(87) PCT Pub. No.: WO2010/073954
PCT Pub. Date: Jul. 1, 2010

(65) Prior Publication Data
US 2011/0261152 A1    Oct. 27, 2011

(30) Foreign Application Priority Data
Dec. 26, 2008 (JP) .................. 2008-333451

(51) Int. Cl.
| | | |
|---|---|---|
| *H04N 5/217* | (2011.01) | |
| *H04N 5/213* | (2006.01) | |
| *H04N 9/04* | (2006.01) | |
| *G08G 1/16* | (2006.01) | |
| *H04N 5/14* | (2006.01) | |
| *G06T 5/00* | (2006.01) | |
| *B60R 1/00* | (2006.01) | |
| *H04N 5/232* | (2006.01) | |
| *H04N 1/58* | (2006.01) | |
| *H04N 5/262* | (2006.01) | |
| *H04N 5/225* | (2006.01) | |

(52) U.S. Cl.
CPC *B60R 1/00* (2013.01); *H04N 5/213* (2013.01); *H04N 5/2628* (2013.01); *B60R 2300/30* (2013.01); *H04N 9/045* (2013.01); *G08G 1/167* (2013.01); *H04N 5/142* (2013.01); *G06T 5/003* (2013.01); *G06T 5/002* (2013.01); *H04N 5/23238* (2013.01); *H04N 5/2259* (2013.01); *H04N 5/217* (2013.01); *G06T 2207/20192* (2013.01); *H04N 1/58* (2013.01)
USPC ............ 348/36; 348/E5.031; 348/E5.078; 348/E7.001; 348/E9.033; 348/222.1; 348/241

(58) Field of Classification Search
CPC .............. B60R 1/00; B60R 2300/30; G06T 2207/20192; G06T 5/002; G06T 5/003; G08G 1/167; H04N 1/58; H04N 5/142; H04N 5/213; H04N 5/217; H04N 9/045
USPC ............. 348/36, 222, 241, E5.031, E5.078, 348/E7.001, E9.033, 222.1; 382/263–264
See application file for complete search history.

(56) References Cited

U.S. PATENT DOCUMENTS

| | | | |
|---|---|---|---|
| 5,157,215 A | 10/1992 | Nakae et al. | |
| 5,402,179 A | 3/1995 | Okada | |

(Continued)

FOREIGN PATENT DOCUMENTS

| | | |
|---|---|---|
| CA | 2 387 627 | 11/2003 |
| EP | 1 117 251 | 7/2001 |

(Continued)

OTHER PUBLICATIONS

Extended European Search Report dated Oct. 15, 2013.

(Continued)

*Primary Examiner* — Christopher S Kelley
*Assistant Examiner* — Asmamaw G Tarko
(74) *Attorney, Agent, or Firm* — Harness, Dickey & Pierce, P.L.C.

(57) ABSTRACT

An image processing apparatus includes a line buffer, an FIR filter serving as an edge enhancement filter that enhances high-frequency components of an image, and an IIR filter serving as a low-pass filter that reduces noise. The same line buffer is used by both the FIR filter and the IIR filter. According to a switching signal, switches enable the FIR filter and disable the IIR filter for a relatively low noise level while the switches enable IIR filter and disable the FIR filter for a relatively high noise level.

13 Claims, 11 Drawing Sheets

(56) References Cited

U.S. PATENT DOCUMENTS

| | | | |
|---|---|---|---|
| 5,757,977 A | 5/1998 | Mancuso et al. | |
| 7,151,858 B2 * | 12/2006 | Kyong | 382/266 |
| 2003/0020836 A1 | 1/2003 | Kobayashi | |
| 2003/0118248 A1 * | 6/2003 | Kyong | 382/266 |
| 2006/0023794 A1 * | 2/2006 | Wan et al. | 375/240.29 |
| 2006/0114357 A1 | 6/2006 | Hsu | |
| 2006/0182361 A1 * | 8/2006 | Ptucha et al. | 382/254 |
| 2007/0115384 A1 * | 5/2007 | Furukawa | 348/335 |
| 2007/0139563 A1 * | 6/2007 | Zhong | 348/607 |
| 2007/0248166 A1 * | 10/2007 | Chen et al. | 375/240.16 |
| 2008/0240203 A1 * | 10/2008 | Baqai et al. | 375/130 |
| 2009/0135277 A1 | 5/2009 | Kasahara | |
| 2009/0190008 A1 | 7/2009 | Kasahara | |
| 2009/0190855 A1 | 7/2009 | Kasahara | |
| 2009/0201417 A1 | 8/2009 | Kasahara | |
| 2009/0202171 A1 | 8/2009 | Kasahara | |
| 2009/0226086 A1 | 9/2009 | Kasahara | |
| 2009/0231416 A1 | 9/2009 | Kasahara | |
| 2009/0231472 A1 | 9/2009 | Kasahara | |
| 2009/0238455 A1 | 9/2009 | Kasahara | |
| 2010/0002105 A1 | 1/2010 | Kasahara | |
| 2012/0105578 A1 * | 5/2012 | Ohmiya et al. | 348/36 |

FOREIGN PATENT DOCUMENTS

| | | |
|---|---|---|
| JP | 04-097295 | 3/1992 |
| JP | 04-247777 A | 9/1992 |
| JP | 05-153547 A | 6/1993 |
| JP | 05-304622 A | 11/1993 |
| JP | 10-084552 A | 3/1998 |
| JP | 2000-137469 | 5/2000 |
| JP | 2004-258266 A | 9/2004 |
| JP | 2005-020193 A | 1/2005 |
| JP | 2005-184786 A | 7/2005 |
| JP | 2006-180200 A | 7/2006 |
| JP | 2009-188840 A | 8/2009 |
| JP | 2009-212818 A | 9/2009 |

OTHER PUBLICATIONS

"FIR Filter Basics," dsp-Guru-Digital Signal Processing Central, Feb. 1, 2001, http://www.dspguru.com/dsp/faqs/fir/basics.

International Search Report mailed Feb. 9, 2010.

Japanese Office Action mailed Dec. 12, 2012.

Office Action issued on Jan. 22, 2014 for corresponding Taiwanese patent application No. 098143666 with English translation.

* cited by examiner

| 0.2 | -0.3 | 0.4 | -0.3 | 0.2 |
|---|---|---|---|---|
| -0.3 | -0.8 | -0.8 | -0.8 | -0.3 |
| 0.2 | -0.8 | 7.8 | -0.8 | 0.2 |
| -0.3 | -0.8 | -0.8 | -0.8 | -0.3 |
| 0.2 | -0.3 | 0.4 | -0.3 | 0.2 |

IMAGE PROCESSING APPARATUS AND ON-VEHICLE CAMERA APPARATUS

TECHNICAL FIELD

The present invention is generally directed to an image processing apparatus that processes an image obtained by using an imaging device such as a charge-coupled device (CCD) and to an on-vehicle camera apparatus that includes the image processing apparatus.

BACKGROUND ART

Demands for on-vehicle camera apparatuses for use in blind corner monitors and rear-view monitors on vehicles have increased in recent years. An image-capturing environment for such an on-vehicle camera apparatus is not always bright; i.e., the image-capturing environment is sometimes relatively dark. Because the brightness of an image frame captured in a relatively dark image-capturing environment is insufficient, against which some countermeasure is required.

In a camera apparatuses that includes an imaging device such as a CCD, when the brightness of the image frame is insufficient, it is typical to adopt a scheme of increasing the gain of an automatic gain control circuit (AGC) of the imaging device thereby obtaining a brighter image. Such a technology has been disclosed, for example, in Japanese Patent Application Laid-open No. H4-247777. Meanwhile, increase in the gain disadvantageously leads to increasing in the noise. As a countermeasure thereagainst, conventionally a scheme of enabling a low-pass filter in a dark portion of the image frame where the brightness is not sufficient thereby reducing noise has been generally employed. A low-pass filter has also been generally implemented by using an infinite impulse response (IIR) filter in circuit of relatively small scale. Such a technology has been disclosed, for example, in Japanese Patent Application Laid-open No. 2005-184786.

Accordingly, use of an IIR filter on an on-vehicle camera apparatus or the like leads to the possibility of increasing the gain in the dark portion to maintain the brightness of the image to a desirable brightness without increasing the noise.

An on-vehicle camera apparatuses or the like typically uses a wide-view-angle optical system and includes, in its image processing unit, a high-frequency enhancement filter, such as a finite impulse response (FIR) filter, for the purpose of correcting degradation in resolution resulting from the optical system. However, a line buffer with a capacity of several lines is indispensable for this high-frequency enhancement filter. Meanwhile, the scheme of implementing a low-pass filter to suppress noise by using an IIR filter requires an additional line buffer. However, under recent circumstances where capacity necessary for a line buffer has been greatly increased due to increase in the number of pixels in imaging devices, providing an additional line buffer for an IIR filter results in increase in circuit scale.

The present invention aims at providing an image processing apparatus that enhances high-frequency components of an image that are attenuated by an optical system and reduces noise in a dark portion without increasing circuit scale and that is of low cost and low power consumption, and an on-vehicle camera apparatus that includes the image processing apparatus.

DISCLOSURE OF INVENTION

According to an aspect of the present invention, there is provided an image processing apparatus that processes image data obtained by an imaging device. The image processing apparatus includes a line buffer that temporarily and sequentially stores therein the image data; a finite impulse response (FIR) filter that performs shaping of spatial frequency characteristics of the image data by using the line buffer; and an infinite impulse response (IIR) filter that uses the same line buffer that is used by the FIR filter as a line buffer for use in feedback of processed image data.

Thus, an additional line buffer is no more necessary for the IIR filter, which leads to reduction in circuit scale.

Specifically, an image processing apparatus that processes an image obtained by using an imaging device, such as a CCD, and an on-vehicle camera apparatus that includes the image processing apparatus are capable of enhancing high-frequency components of the image that are attenuated by an optical system and reducing noise in a dark portion without involving increase in circuit scale.

BEST MODE(S) FOR CARRYING OUT THE INVENTION

Exemplary embodiments of the present invention are described in detail below with reference to the accompanying drawings. One embodiment of the present invention provides an image capturing apparatus that captures an image of a subject by using a wide-view-angle optical system with large magnification chromatic aberration and high distortion occur. The image capturing apparatus includes an image processing system that performs, in addition to MTF correction, correction of the magnification chromatic aberration, correction of the distortion, and the like. It is needless to say that the configuration is not limited to this.

Moreover, in the following explanation, it is assumed that an image is composed of additive primary colors, i.e., red (R), green (G), and blue (B). It is needless to say that the present invention can be applied to a case where an image is composed of subtractive primary colors, i.e., yellow (Y), magenta (M), and cyan (C).

Figure 1:
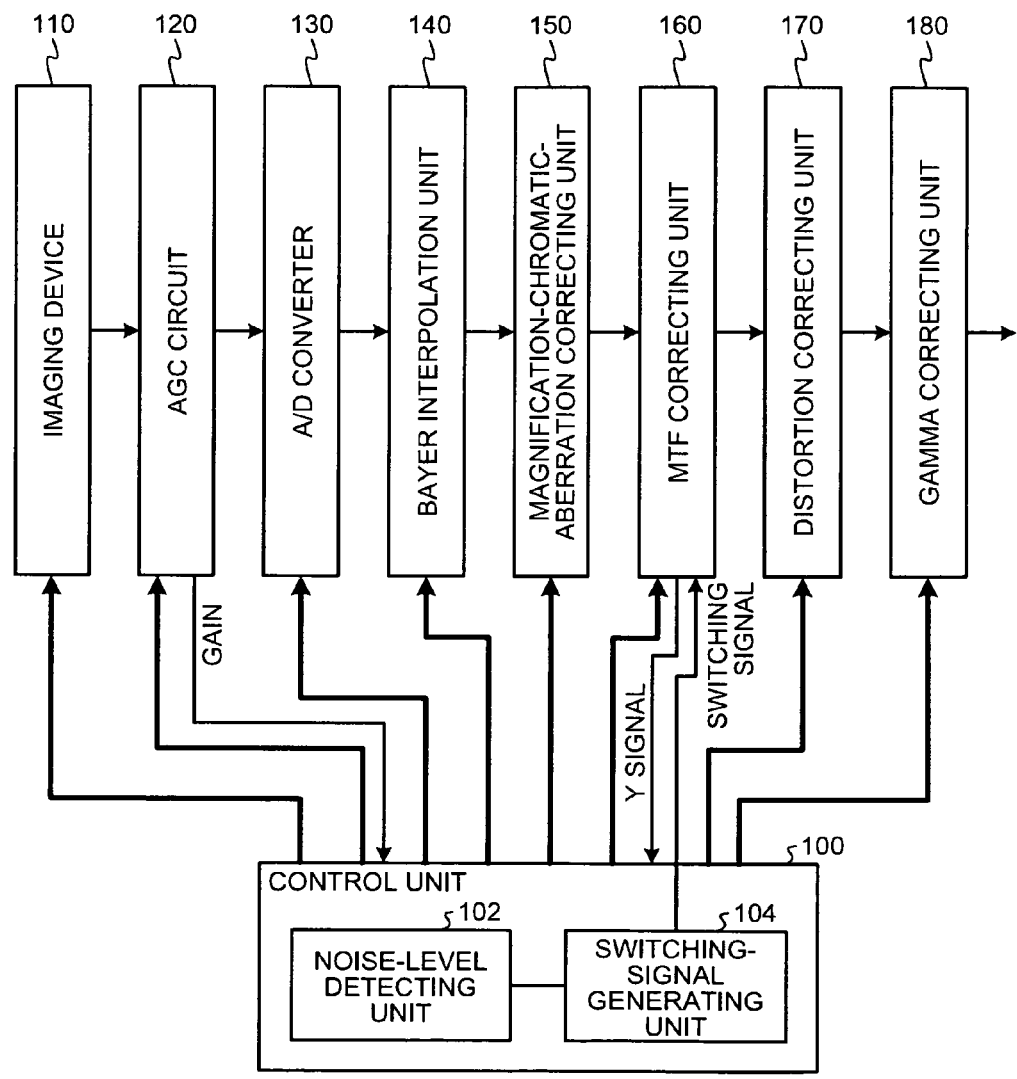
FIG. 1 is a block diagram illustrating the overall configuration of an image capturing apparatus according to an embodiment of the present invention.

FIG. 1 is a functional block diagram of an image processing system in the image capturing apparatus according to an embodiment of the present invention. The image capturing apparatus further externally includes an operating unit, an image storage unit, and an image display unit (monitor), which are not shown in FIG. 1. It is assumed that the image capturing apparatus is used as an on-vehicle camera apparatus. It is needless to say that the image capturing apparatus can be used in some other way.

The image capturing apparatus includes a control unit 100. The control unit 100 supplies control signals (clock, lateral/longitudinal synchronization signal, and others) to all the other units of the image capturing apparatus. That is, the control unit 100 controls operations of all the other units in pipeline. The control unit 100 includes a noise-level detecting unit 102 that detects a noise level of an image based on a gain of an AGC circuit 120 and a luminance signal obtained at an MTF correcting unit 160 and a switching-signal generating unit 104 that generates a switching signal for enabling and disabling an IIR filter and an FIR filter to provide their functions, which will be described later, in the MTF correcting unit 160 based on a result of detection performed by the noise-level detecting unit 102.

The image capturing apparatus includes an imaging device 110. The imaging device 110 includes elements, e.g., a charge-coupled device (CCD) or a complementary metal oxide semiconductor (CMOS) sensor and converts an optical image captured by using a wide-angle optical system (not shown) into electric signals (pixel signals). The wide-angle optical system has large magnification aberration and distortion. The imaging device 110 further includes a Bayer-array color filter and sequentially outputs RGB pixel signals in a Bayer array according to coordinate values (x, y) fed from the control unit 100. The control unit 100 also sequentially feeds the coordinate values (x, y), which it feeds to the imaging device 110, to the units arranged at a subsequent stage of the control unit 100 with a predetermined time lag.

In an alternative configuration, instead of the control unit 100, the imaging device 110 generates the coordinate values (x, y) in response to reception of clock and lateral/longitudinal synchronization signals and sequentially feeds them to the units arranged at a subsequent stage of the control unit 100.

The image capturing apparatus includes the AGC circuit 120 at a subsequent stage of the imaging device 110. The AGC circuit 120 amplifies a pixel signal, which is an analog signal, output from the imaging device 110 to a predetermined level. The gain of the AGC circuit 120 is set to an appropriate value by making tradeoffs between a required lightness of an image frame and a noise level. As will be mentioned later, the noise-level detecting unit 102 in the control unit 100 detects a noise level of an image based on the gain of this AGC circuit 120.

The image capturing apparatus includes an analog-to-digital (A/D) converter 130 at a subsequent stage of the AGC circuit 120. The Bayer-array RGB image signals output from the AGC circuit 120 are analog signals. The A/D converter 130 converts the analog Bayer-array RGB image signals into digital signals (pixel data). Each of the digital signals is a signal with, for example, 8 bits per color of RGB.

The image capturing apparatus includes a Bayer interpolation unit 140 at a subsequent stage of the A/D converter 130. The Bayer interpolation unit 140 receives the digital Bayer-array RGB image signal (pixel data), generates pixel data for all coordinate positions by performing linear interpolation on an individual color basis of RGB.

Although, in the present embodiment, the imaging device has been discussed as including the Bayer-array color filter, the present embodiment is also effective for an imaging device that includes a color filter of another arrangement, such as another CMYG array or an RGB-and-infrared-ray (Ir) array. Particularly, an imaging device that includes such a color filter that has a four-color array as mentioned earlier requires, as compared to a type of three colors such as RGB, a memory of lower latency or a 4-port random access memory (RAM) for correction of magnification chromatic aberration.

The image capturing apparatus includes a magnification-chromatic-aberration correcting unit 150 at a subsequent stage of the Bayer interpolation unit 140. The magnification-chromatic-aberration correcting unit 150 receives the Bayer-interpolated R, G, and B pixel data, performs coordinate transformation (coordinate transformation for magnification chromatic aberration) on an individual chrominance component basis of RGB by using a predetermined polynomial, and outputs RGB pixel data having undergone the magnification chromatic aberration correction. As will be mentioned later, the coordinate transformation for correcting the magnification chromatic aberration can be performed by using a memory that has a relatively small capacity and low latency or a memory (e.g., a static random access memory (SRAM)) that has a relatively small capacity and a plurality of ports.

The image capturing apparatus includes an MTF correcting unit 160 at a subsequent stage of the magnification-chromatic-aberration correcting unit 150. The MTF correcting unit 160 includes, as will be mentioned later, an FIR filter serving as an edge enhancement filter and an IIR filter serving as a noise reduction filter. The MTF correcting unit 160 receives an input of RGB pixel data having undergone the magnification chromatic aberration correction, converts the RGB pixel data into luminance signals Y and chrominance signals Cb and Cr, and thereafter, under a normal condition, performs high-frequency enhancement (edge enhancement) of the Y signals by using the FIR filter; however, under a condition where the noise level of an image has been increased, performs noise reduction of the YCbCr signals by using the IIR filter, converts YCbCr signal having undergone either the edge enhancement or the noise reduction back into RGB signals (RGB pixel data), and outputs the RGB signals. The present invention is directed to the FIR filter and the IIR filter of this MTF correcting unit 160. According to an embodiment, as will be mentioned later, the noise-level detecting unit 102 in the control unit 100 obtains average lightness of an image based on the luminance signals Y obtained by the MTF correcting unit 160, thereby detecting a noise level.

The image capturing apparatus includes a distortion correcting unit 170 at a subsequent stage of the MTF correcting unit 160. The distortion correcting unit 170 receives the RGB pixel data having undergone the magnification chromatic aberration correction and the MTF correction, performs coordinate transformation (coordinate transformation for distortion) of the RGB chrominance components collectively by using a predetermined polynomial or the like, and outputs RGB pixel data having undergone the distortion correction.

As will be mentioned later, a memory for use in the coordinate transformation for the distortion correction desirably has a larger capacity (by one image frame at maximum) than a memory for use in the magnification chromatic aberration correction; however, the number of ports required of the memory for correcting the distortion is one. Therefore, as this memory, a memory (dynamic random access memory (DRAM) or the like) of high latency can be used.

The image capturing apparatus includes a gamma correcting unit 180 at a subsequent stage of the distortion correcting unit 170. The gamma correcting unit 180 receives the RGB pixel data output from the distortion correcting unit 170, performs predetermined gamma correction on the data by using lookup tables or the like on an individual color basis of RGB, and outputs RGB pixel data having undergone the gamma correction. The pixel data output from the gamma correcting unit 180 is monitor-displayed on a display unit (not shown).

The image capturing apparatus having the configuration illustrated in FIG. 1 can provide an imaging system of high-image-quality that is small in circuit scale and of low cost can be provided even when the system uses a high-view-angle optical system that causes chromatic magnification aberration and distortion to occur. Even when a noise level of an image increases due to an increase in gain in a dark portion, the noise level can be suppressed. Meanwhile, the magnification-chromatic-aberration correcting unit 150 can be replaced with a magnification-chromatic-aberration-and-distortion correcting unit that corrects magnification chromatic aberration and distortion simultaneously. When such a magnification-chromatic-aberration-and-distortion correcting unit is employed, the distortion correcting unit 170 becomes unnecessary. The gamma correcting unit 180 can be arranged at an immediately subsequent stage of the Bayer interpolation unit 140.

Specific exemplary configurations of the magnification-chromatic-aberration correcting unit 150, the MTF correcting unit 160, and the distortion correcting unit 170 will be described in detail below.

Prior to giving a detailed description about the magnification-chromatic-aberration correcting unit 150 and the distortion correcting unit 170, principles of magnification chromatic aberration correction and distortion correction will be described.

Figure 2:
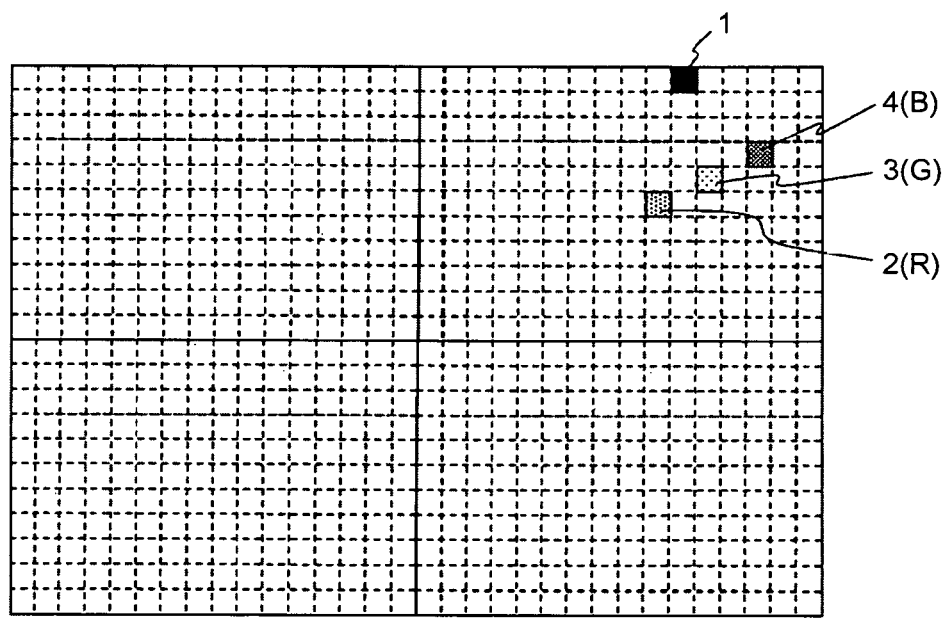
FIG. 2 is a diagram for explaining magnification chromatic aberration and distortion.

As schematically illustrated in FIG. 2, when an image is captured by using an optical system and when magnification chromatic aberration and distortion occurs, pixel data pertaining to an original position (pixel) at the upper right of an image frame indicated by 1 is shifted from this original position due to distortion, and further shifted differently among different chrominance components of RGB due to magnification chromatic aberration. Accordingly, an R component, a G component, and a B component actually imaged by the imaging device are shown in FIG. 2 as 2(R), 3(G), and 4(B), respectively. Magnification chromatic aberration correction and distortion correction can be performed by copying the pixel data pertaining to the RGB chrominance components at the positions (pixels) of 2(R), 3(G), 4(B) to the position (pixel) of 1, which is the original position; i.e., by performing coordinate transformation. In performing the coordinate transformation, the positions 2, 3, and 4 are employed as coordinate-transformation source coordinates while the position 1 is employed as coordinate-transformation target coordinates.

The amount of distortion and the amount of magnification chromatic aberration can be obtained from design data of the optical system; and it is therefore possible to calculate amounts of shifts of the RGB chrominance components relative to the original position.

Figure 3:
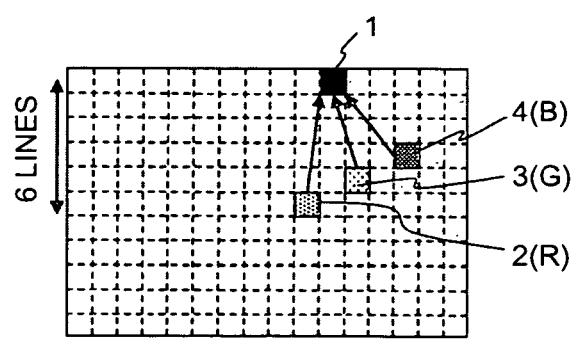
FIG. 3 is a diagram for explaining simultaneous correction of magnification chromatic aberration and distortion.

FIG. 3 is a schematic for explaining a method for correcting magnification chromatic aberration and distortion simultaneously. Specifically, the magnification chromatic aberration and distortion can be corrected simultaneously by copying the pixel data pertaining to the RGB chrominance components at the positions (pixels) of 2(R), 3(G), and 4(B) to the position (pixel) of 1, which is the original position; in other words, by performing coordinate transformation. However, this method is disadvantageous in that in this method it is necessary to provide a memory that has relatively large capacity and any one of low latency and multiple ports for each of RGB. For example, in the example illustrated in FIG. 3, a fast, 6-line memory becomes necessary for each of RGB to perform the coordinate transformation.

Figure 4A:
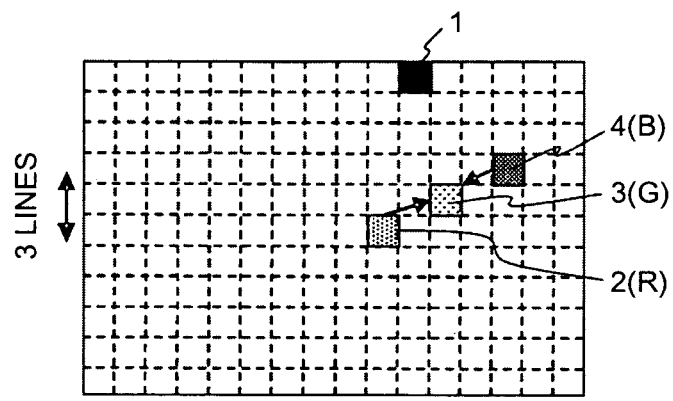
FIGS. 4A and 4B are diagrams explaining independent correction of magnification chromatic aberration and distortion.
Figure 4B:
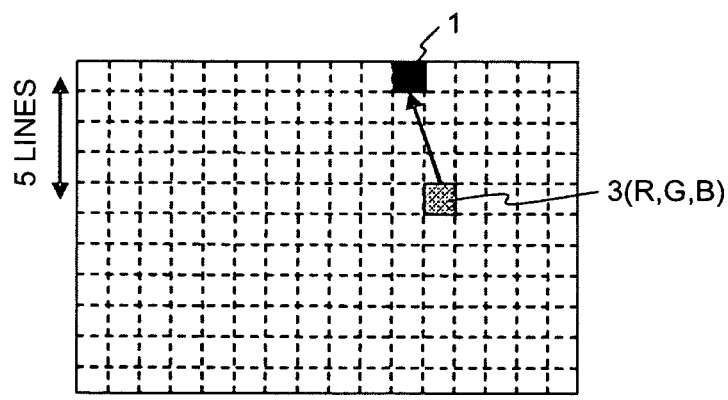

FIGS. 4A and 4B are schematics for explaining the methods for correcting magnification chromatic aberration and distortion independently. Although magnification chromatic aberration occurs at shift amounts that differ among different chrominance components, the shift amounts are relatively small. In contrast, distortion occurs with a relatively large shift amount but the shift amount is same for the different chrominance components. With an attention focused on this, coordinate transformation of pixel data is performed on an individual chrominance component basis of RGB (in the example to be mentioned later, RB chrominance components are subjected to coordinate transformation and copied to the position of G component) to correct magnification chromatic aberration; thereafter, the RGB pixel data having undergone the magnification chromatic aberration correction is subjected, as one set of data, to coordinate transformation for distortion correction. This method allows to separately use memories for use in the coordinate transformation for magnification chromatic aberration correction and for the coordinate transformation for distortion correction. More concretely, it is possible to use a fast (low-latency or with multiple ports), small-capacity memory that is for RGB for use in the coordinate transformation for magnification chromatic aberration correction and use a slow (high-latency or with a single port), large-capacity memory to be shared among RGB and for use in the distortion correction. Use of separate memories leads to cost reduction. The system configuration of FIG. 1 is given for illustration of this.

Referring to FIG. 4A, which is a schematic of magnification chromatic aberration correction, pixel data pertaining to RB chrominance components at the positions (pixels) 2(R) and 4(B) is subjected to coordinate transformation to be copied to 3(G), which is the position (pixel) of a G component. The magnification chromatic aberration correction is achieved by performing this operation. Referring to FIG. 4B, which is a schematic of distortion correction, pixel data having undergone the magnification chromatic aberration correction and pertaining to RGB chrominance components at the positions (pixels) 3 is subjected, as one set of data, to coordinate transformation to be copied to the position (pixel) 1, which is the original position. The distortion correction is achieved by performing this operation.

In the example illustrated in FIGS. 4A and 4B, a a-line, fast memory that processes RGB individually can be satisfactorily used for the magnification chromatic aberration correction. On the other hand, a 5-line memory for the distortion correction is additionally required; however, this memory can be a slow memory to be shared among RGB, which leads to total cost reduction as compared to FIG. 3.

The distortion discussed here denotes distortion of a lens in a projection scheme to be used. Examples of the projection scheme to be used include a projection scheme for obtaining an image as viewed from above a camera and a projection scheme for displaying a portion of an image in an enlarged manner.

Figure 5:
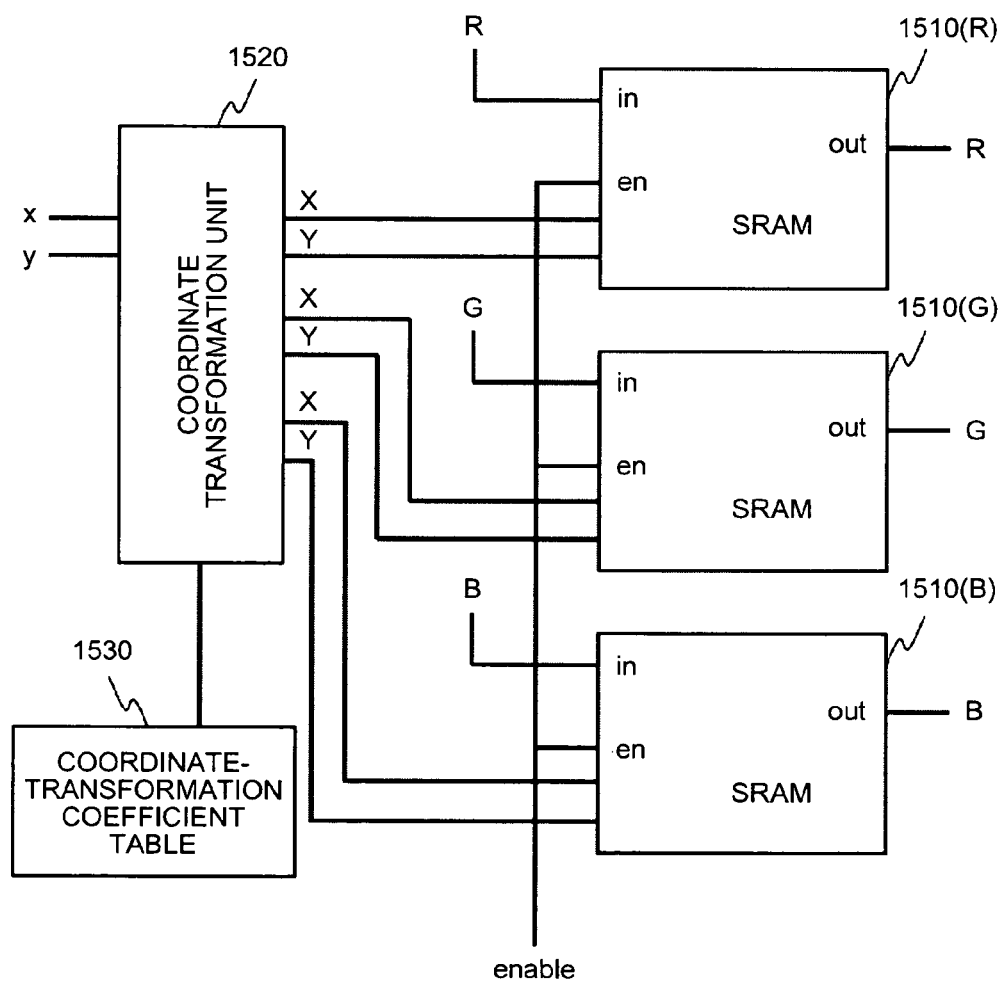
FIG. 5 is a block diagram illustrating the detailed configuration of a magnification-chromatic-aberration correcting unit illustrated in FIG. 1.

FIG. 5 is a schematic configuration diagram of the magnification-chromatic-aberration correcting unit 150. The magnification-chromatic-aberration correcting unit 150 includes coordinate-transformation memories (line buffers) (SRAM) for correcting magnification chromatic aberration, in which 1510(R), 1510(G), and 1510(B) are for an R chrominance component, a G chrominance component, and a B chrominance component, respectively; a coordinate transformation unit 1520 that calculates transformation coordinates for magnification chromatic aberration correction on an individual color basis of RGB based on a predetermined coordinate transformation algorithm; and a coordinate-transformation coefficient table 1530 that stores therein coefficients for use in the coordinate transformation algorithm.

The magnification chromatic aberration correction can be satisfactorily performed with, as a line buffer, a memory having relatively small capacity and yet having either three ports for RGB or low latency. In this example, each of the coordinate transformation memories 1510(R), 1510(G), and 1510(B) is assumed to include an SRAM with capacity of 20 lines on an assumption that a maximum shift amount due to magnification chromatic aberration is 20 lines. The size of the memory in the X-direction depends on the resolution. For example, the size in the X-direction of 640 dots is sufficient when the resolution is equivalent to that of video graphics array (VGA) (640×480). The color depth is 8 bits per color of RGB, and writing and reading from and to each of the coordinate transformation memories 1510(R), 1510(G), and 1510 (B) is performed in an 8-bit unit.

Thus, each of the coordinate transformation memories 1510(R), 1510(G), and 1510(B) is small in capacity; therefore, each of the memories desirably includes a 3-port SRAM provided in an image processing chip to ensure a memory area to contain the 20 lines. When the memory is a low-latency memory such as SRAM, a 1-port memory can be used as a 3-port memory in a time sharing manner.

The pixel data of individual colors of RGB having undergone the magnification chromatic aberration is sequentially written to a corresponding one of the coordinate transformation memories 1510(R), 1510(G), and 1510(B) from its first line according to corresponding coordinate values (x, y). When 20 lines of pixel data has been written to each of the memories, pixel data is discarded sequentially from the first line and subsequent lines of pixel data are sequentially newly written to take place of the discarded data. Thus, RGB pixel data, of 20 lines at maximum per memory, that is necessary to perform the coordinate transformation for correcting the magnification chromatic aberration is sequentially stored in each of the coordinate transformation memories 1510(R), 1510(G), and 1510(B).

The coordinate values (x, y) indicate a read-out position of one frame of a captured image. Meanwhile, each of the coordinate transformation memories 1510(R), 1510(G), and 1510 (B) is 20-line line buffer in which a line to be written cyclically changes; therefore, it is useless to use the coordinate values (x, y) directly as write addresses on the coordinate transformation memories 1510(R), 1510(G), and 1510(B). Therefore, it is necessary to translate the coordinate values (x, y) into real addresses on the coordinate transformation memories 1510(R), 1510(G), and 1510(B); however, the configuration for this is not illustrated in FIG. 5. The same goes for the relation in reading operation between post-transformation coordinate values (X, Y) and read addresses on the coordinate transformation memories 1510(R), 1510(G), and 1510(B), which will be described later.

The coordinate transformation unit 1520 receives the coordinate values (x, y), which are coordinate-transformation target coordinates, calculates transformation coordinates for magnification chromatic aberration correction on an individual color basis of RGB by using predetermined coordinate transformation algorithm, such as polynomial, and outputs coordinate values (X, Y), which are coordinate-transformation source coordinates on an individual color basis of RGB. As illustrated in FIG. 4A, in the present embodiment, R and B chrominance components are subjected to coordinate transformation to be copied to the position of a G component. Accordingly, while, with regard to the G component, the coordinate transformation unit 1520 that receives an input the coordinate values (x, y) outputs them as the coordinate values (X, Y) without performing transformation, with regard to the R and B chrominance components, the coordinate transformation unit 1520 transforms the thus-input coordinate values (x, y) on an individual color basis of RB by using predetermined coordinate transformation algorithm into the coordinate values (X, Y) and outputs the coordinate values (X, Y). This operation is repeated for each set of coordinate values (x, y).

When an origin is assumed at the center of an image frame, the coordinate transformation algorithm can be expressed with following Equation (1):

$$X = x + [a(1) + a(2) \times abs(x) + a(3) \times abs(y) + a(4) \times y^2] \times x$$

$$Y = y + [b(1) + b(2) \times abs(y) + b(3) \times abs(x) + b(4) \times x^2] \times y \quad (1)$$

where abs( ) is an absolute value of the parameter in ( ), and a(1) to a(4) and b(1) to b(4) are coordinate transformation coefficients. The coordinate transformation coefficients are stored in the coordinate-transformation coefficient table 1530 in advance.

In parallel (in actual, with a delay of a predetermined period of time) with the writing to the coordinate transformation memories 1510(R), 1510(G), 1510(B) mentioned earlier, the RGB pixel data is sequentially read from the coordinate transformation memories 1510(R), 1510(G), 1510(B) according to the coordinate values (X, Y) output from the coordinate transformation unit 1520 (in actual, address-translated values of the coordinate values (X, Y)). In this case, G-component pixel data is read from the coordinate transformation memory 1510(G) at the same position as that where the G-component pixel data has been written. In contrast, each of R-component pixel data and B-component pixel data is read from a corresponding one of the coordinate transformation memories 1510(R) and 1510(B) at a position shifted from the position where the chrominance component pixel data has been written by a predetermined distance; i.e., by an amount of magnification chromatic aberration.

By performing the above operations, the RGB pixel data having undergone the magnification chromatic aberration correction is output from the coordinate transformation memories 1510(R), 1510(G), and 1510(B). Specifically, the RGB pixel data at the coordinate-transformation source coordinate values (X, Y) are output as the RGB pixel data at the coordinate-transformation target coordinate values (x, y).

Figure 6A:
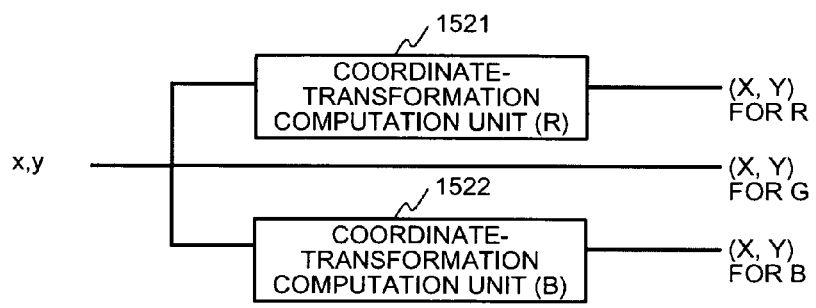
FIGS. 6A to 6C are block diagrams illustrating exemplary configurations of a coordinate transformation unit illustrated in FIG. 5.
Figure 6B:
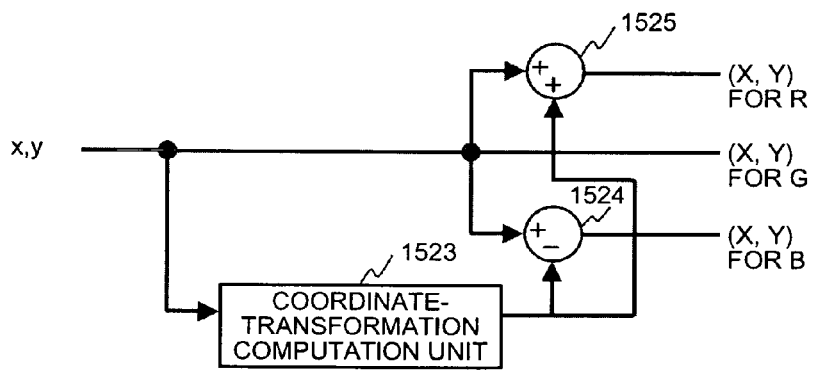
Figure 6C:
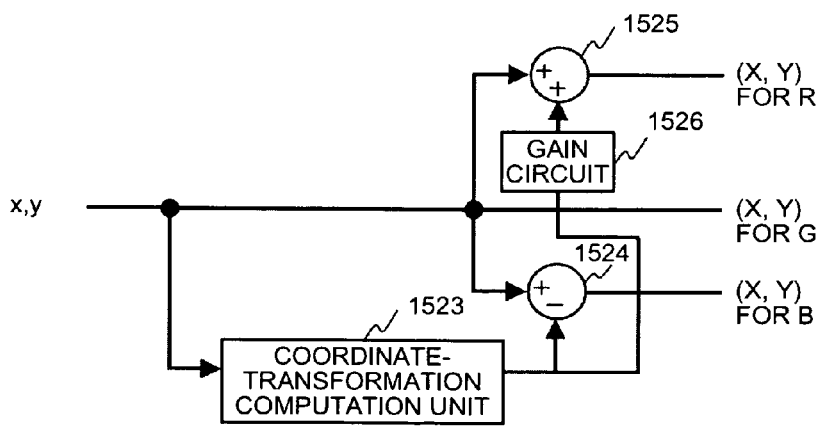

FIGS. 6A to 6C illustrate various exemplary configurations of the coordinate transformation unit 1520. FIG. 6A is an exemplary configuration where a chrominance component for G is not subjected to coordinate transformation and coordinate values (x, y), which are input values, are output as coordinate values (X, Y) for G, while chrominance components for R and B are subjected to coordinate transformation performed by a coordinate-transformation computation unit 1521 for R and a coordinate-transformation computation unit 1522 for (B), respectively, that transform the coordinate values (x, y), which are the input values, to output coordinate values (X, Y) for R and coordinate values (X, Y) for B. Because the coordinate-transformation computation units are provided only for the R and B chrominance components, it is possible to suppress the circuit scale.

FIGS. 6B and 6C illustrate other exemplary configurations devised with a focus given to a fact that R and B chrominance components are generally shifted by magnification chromatic aberration to be substantially symmetrical about a G chrominance component (FIG. 2). FIG. 6B illustrates an exemplary configuration where one coordinate-transformation computation unit 1523 calculates correction amounts for the coordinate values (x, y), a subtracting unit 1524 subtracts the correction amounts from the coordinate values (x, y) to obtain coordinate values (X, Y) for B, while an adding unit 1525 adds the correction amounts to the coordinate values (x, y) to obtain coordinate values (X, Y) for R. On the other hand, the input coordinate values (x, y) for G are output as they are as the coordinate values (X, Y) for G in the same manner as that shown in FIG. 6A.

FIG. 6C depicts an exemplary configuration where a gain circuit 1526 is provided to adjust the correction amounts for R to allow for deviation between symmetrical positions. The exemplary configurations illustrated in FIGS. 6B and 6C have been embodied with only one coordinate-transformation computation unit, leading to further reduction in circuit scale.

A look-up table (LUT) that stores therein correspondence between input coordinate values (x, y) and output coordinate values (X, Y) for each of R and B chrominance components can be provided in place of the coordinate-transformation computation units 1521 and 1522 illustrated in FIG. 6A so that coordinate-transformation source coordinate values (X, Y) corresponding to coordinate-transformation target coordinate values (x, y) can be directly obtained by using the LUT. Similarly, an LUT that stores therein correspondence between input coordinate values (x, y) and correction amounts can be provided in place of the coordinate-transformation computation unit 1523 illustrated in FIGS. 6B and 6C so that correction amounts corresponding to coordinate values (x, y) can be directly obtained by using the LUT. This allows omitting calculations for coordinate transformation, thereby making magnification chromatic aberration correction implementable basically only on memory chip.

Figure 7:
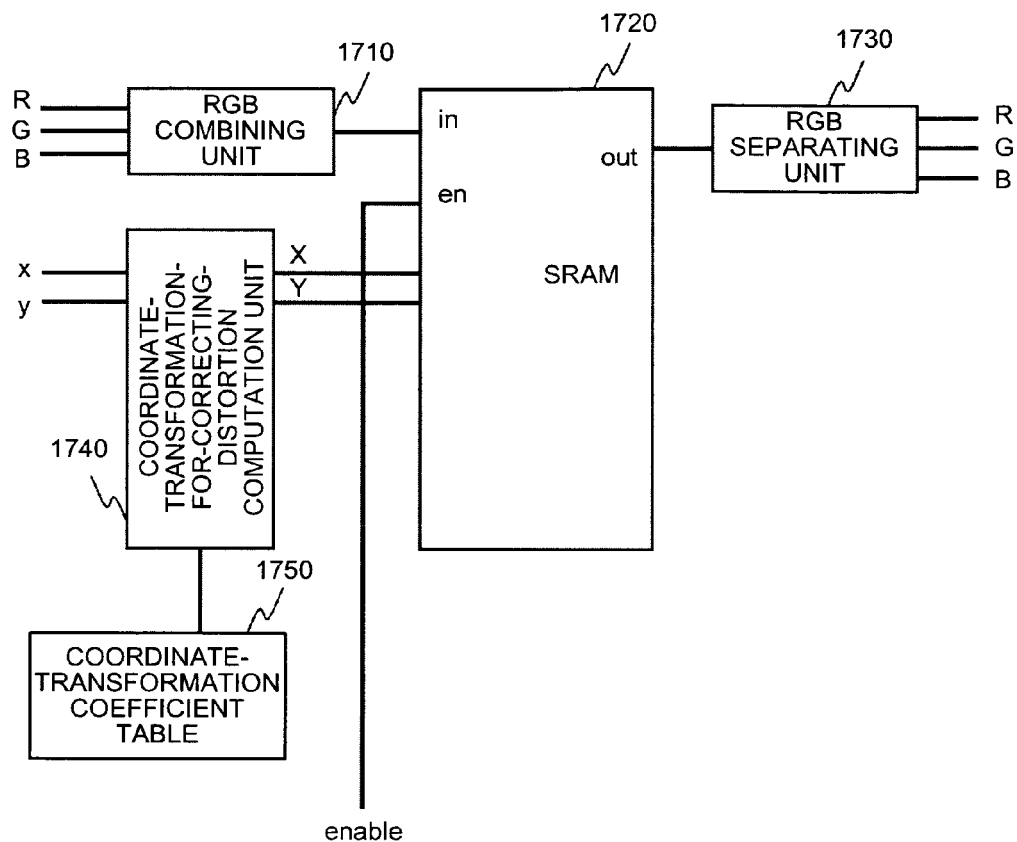
FIG. 7 is a block diagram illustrating the detailed configuration of a distortion correcting unit illustrated in FIG. 1.

FIG. 7 is a detailed configuration diagram of the distortion correcting unit 170. The distortion correcting unit 170 includes an RGB combining unit 1710 that combines three pieces, each corresponding to one color, of RGB pixel data into one data piece; a coordinate transformation memory 1720 (SRAM) that is to be shared among the chrominance components of the RGB pixel data and for use in the distortion correction; an RGB separating unit 1730 that separates the combined RGB pixel data into original chrominance components; a coordinate-transformation-for-correcting-distortion computation unit 1740 that calculates transformation coordinates for the distortion correction of the combined RGB pixel data by using predetermined coordinate transformation algorithm; and a coordinate-transformation coefficient table 1750 that stores therein coefficients to be used with the coordinate transformation algorithm.

Because distortion occurs with a relatively large shift amount, a buffer memory for storing therein pixel data of one image frame at maximum is desirably used to perform the distortion correction. Meanwhile, because the RGB chrominance components are shifted by a single shift amount, a single buffer memory having a bit width equal to a total bit number of the RGB pixel data can be satisfactorily employed. It is assumed that resolution is of the VGA (640×480), the number of bits (color depth) of the RGB pixel data is 8 bits per color of RGB, and the coordinate transformation memory 1720 is a DRAM to and from which writing and reading is performed in a unit of 24-bit, 640×480 dots.

The coordinate transformation memory 1720 that requires a considerably large capacity as mentioned above is difficult to be embodied in the form of an SRAM in an image processing chip in view of cost, and a 1-port memory can be satisfactorily used to handle RGB; therefore, the coordinate transformation memory 1720 is desirably embodied by using a DRAM provided outside the image processing chip.

The RGB combining unit 1710 receives the RGB pixel data (8 bits each) having undergone the magnification chromatic aberration correction, sequentially combines the RGB pixel data into one piece of pixel data (24 bits), and outputs the pixel data. The thus-combined RGB pixel data is sequentially written to the coordinate transformation memory 1720 from its first line according to coordinate-transformation target coordinate values (x, y).

Meanwhile, the coordinate-transformation-for-correcting-distortion computation unit 1740 receives the coordinate-transformation target coordinate values (x, y), calculates transformation coordinates, which are common to RGB, for the distortion correction by using a predetermined coordinate transformation algorithm, such as polynomial, and outputs coordinate-transformation source coordinate values (X, Y). The coordinate transformation algorithm can be expressed as Equation (1), which is the same as that for use in the magnification chromatic aberration correction mentioned earlier. As a matter of course, different coordinate transformation coefficients are to be used. The coordinate transformation coefficients are stored in the coordinate-transformation coefficient table 1750 in advance.

In parallel (to be precise, with a delay of a predetermined period of time) with the writing of the combined RGB pixel data (24 bits) to the coordinate transformation memory 1720 mentioned earlier, combined RGB pixel data is sequentially read from the coordinate transformation memory 1720 according to the coordinate values (X, Y) output from the coordinate-transformation-for-correcting-distortion computation unit 1740. The RGB separating unit 1730 separates the combined RGB pixel data (24 bits) read from the coordinate transformation memory 1720 into its original pixel data of individual R, G, and B components (8 bits each).

As a result of these operations, R pixel data, G pixel data, and B pixel data having undergone the distortion correction are output from the RGB separating unit 1730. Put another way, the R pixel data, the G pixel data, and the B pixel data are copied to the coordinate values (x, y), or their original position.

Also in the case of the distortion correction, an LUT that stores therein correspondence between input coordinate values (x, y) and output coordinate values (X, Y) can be provided so that coordinate-transformation source coordinate values (X, Y) corresponding to coordinate-transformation target coordinate values (x, y) are directly obtained by using the LUT. This allows omitting calculations for coordinate transformation, thereby making distortion correction implementable basically only on memory chip as well.

Figure 8:
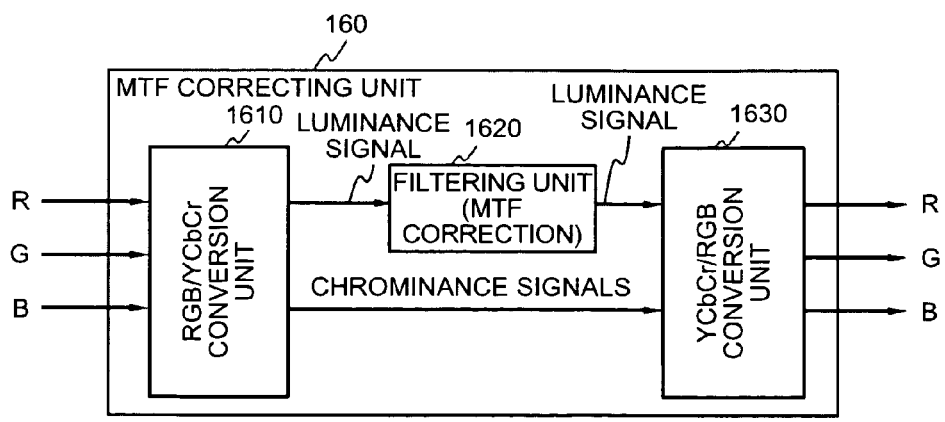
FIG. 8 is a block diagram illustrating the configuration of a modulation transfer function (MTF) correcting unit illustrated in FIG. 1.

The MTF correcting unit 160 will be described below. As illustrated in FIG. 8, the MTF correcting unit 160 includes an RGB/YCbCr conversion unit 1610, a filtering unit 1620, and a YCbCr/RGB conversion unit 1630.

The RGB/YCbCr conversion unit 1610 receives an input of the RGB pixel data and separates the RGB pixel data into luminance signals Y and chrominance signals Cb and Cr by using, for example, the following equations:

$$Y=0.299R+0.587G+0.114B \quad (2)$$

$$Cr=0.500R-0.419G-0.081B \quad (3)$$

$$Cb=-0.169R-0.332G+0.500B \quad (4)$$

The filtering unit 1620 includes an edge enhancement filter (FIR filter) and a noise reduction filter (IIR filter), and performs, under a normal condition, high-frequency enhancement (edge enhancement) of the luminance signals Y by using the FIR filter; however, when the noise level in an image has been increased, performs noise reduction of the YCbCr signals by using the IIR filter. A feature of the present invention resides in the configuration of the filtering unit 1620. A specific configuration and operations of the filtering unit 1620 will be described in detail later.

The YCbCr/RGB conversion unit 1630 receives an input of the YCbCr signals having undergone any one of the high-frequency enhancement and the noise reduction, converts the signals back into RGB pixel data by using the following equations for example, and outputs the RGB pixel data:

$$R=Y+1.402Cr \quad (5)$$

$$G=Y-0.714Cr-0.344Cb \quad (6)$$

$$B=Y+1.772Cb \quad (7)$$

The YCbCr/RGB conversion unit 1630 can be omitted when luminance signals Y and chrominance signals YCbCr, rather than RGB signals, are desirably output to a subsequent stage.

Figure 9:
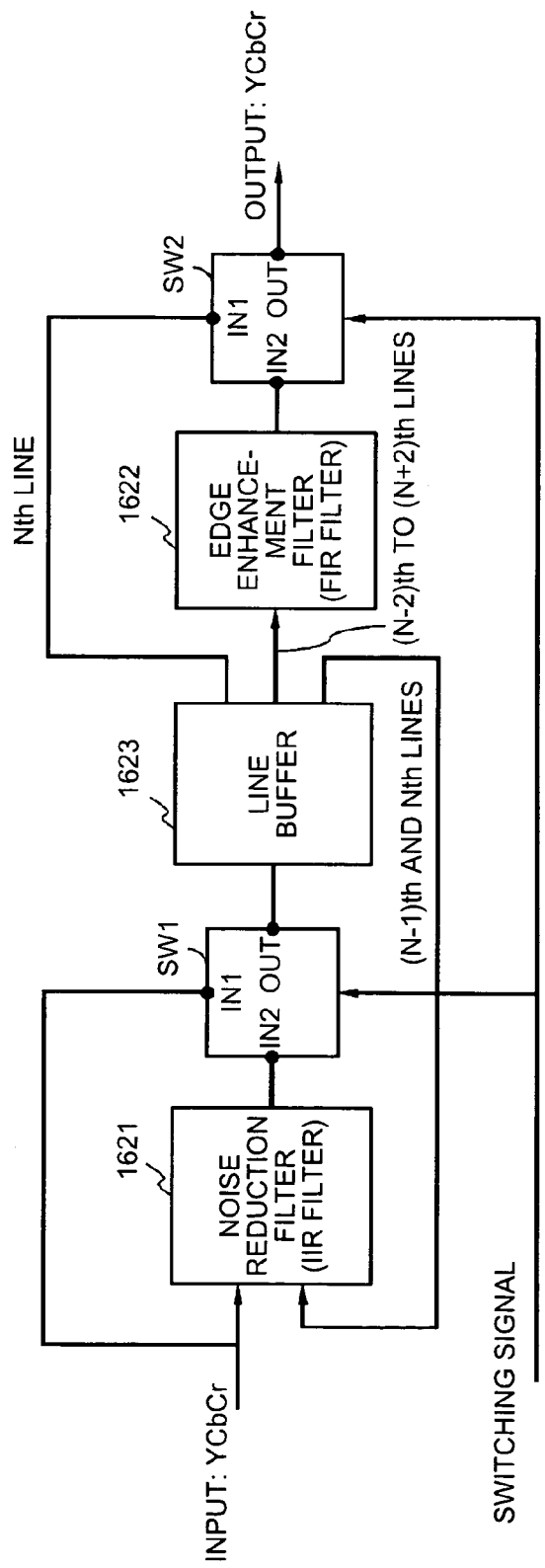
FIG. 9 is a block diagram illustrating the configuration of a filtering unit illustrated in FIG. 8.

FIG. 9 is a schematic diagram of the specific configuration of the filtering unit 1620 in the MTF correcting unit 160. As illustrated in FIG. 9, the filtering unit 1620 includes an IIR filter 1621 serving as a noise reduction filter, an FIR filter 1622 serving as an edge enhancement filter, a line buffer 1623 to be used by both the IIR filter 1621 and the FIR filter 1622, and switches SW1 and SW2.

Meanwhile, a switching signal is fed to each of the switches SW1 and SW2 from the switching-signal generating unit 104 (FIG. 1) in the control unit 100. How the switching signal is generated will be described later. Under a normal condition where a noise level of an image is relatively low, the switch SW1 disables the IIR filter 1621 so that the YCbCr signals that are input are directly sent to the line buffer 1623 while the switch SW2 enables the FIR filter 1622 so that the YCbCr signals are sent from the FIR filter 1622 out through the output terminal. In contrast, when a noise level of an image is relatively high, the switch SW1 enables the IIR filter 1621 so that YCbCr signals are sent from the IIR filter 1621 to the line buffer 1623 while the switch SW2 disables the FIR filter 1622 so that the YCbCr signals are directly sent from the line buffer 1623 out through the output terminal.

The line buffer 1623 is used by both the IIR filter 1621 for use in noise reduction and the FIR filter 1622 for use in edge enhancement. For the FIR filter 1622 of which number of the taps is set to, for example, 5×5, a line buffer with capacity of 5 lines or larger can be satisfactorily used as the line buffer 1623. Meanwhile, the line buffer 1623 stores therein 1 pixel of YCbCr signals (YCbCr data) at each address, to which, for example, 24 bits (1 word) are assigned to each address, where a 24-bit signal is formed with RGB components whose color depth is 8 bits each; i.e., YCbCr components of 8 bits each.

Figures 10, 11:
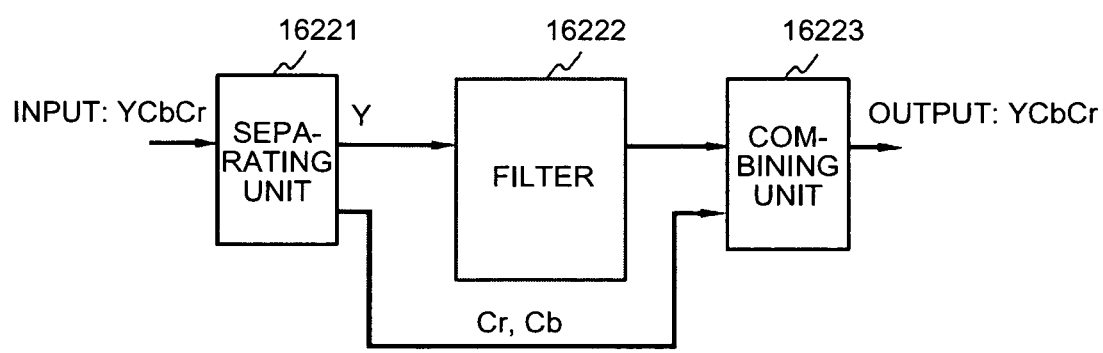
FIG. 10 is an illustration of example coefficients for an FIR filter illustrated in FIG. 9.
FIG. 11 is a block diagram illustrating the configuration of the FIR filter.

Under a normal condition where a gain of the AGC circuit 120 is relatively low, i.e., where an image has a relatively low noise, the FIR filter 1622 enhances high-frequency components of the image (edge enhancement) that are attenuated by an optical system, thereby performing shaping of spatial frequency characteristics. FIG. 10 illustrates example coefficients set to the FIR filter 1622. The FIR filter 1622 sequentially reads YCbCr signals of 5×5 pixels, at the center of which a target pixel is located, on the (N−2)th to (N+2)th lines from the line buffer 1623 and performs edge enhancement filtering on the Y signal of the target pixel. This prevents increase in the noise level of the chrominance signals CbCr.

FIG. 11 is a detailed configuration diagram of the FIR filter 1622. A separating unit 16221 reads YCbCr signals from the line buffer 1623 as an input and separates the YCbCr signals into Y signals and CbCr signals. A filter 16222 performs edge enhancement of the Y signals by using such coefficients as given in FIG. 10. A combining unit 16223 combines the signals having undergone the edge enhancement and the CbCr signals together to output YCbCr signals.

Returning to FIG. 9, when the noise level in an image has been increased due to an increase in gain of the AGC circuit 120 in a dark portion or the like, the IIR filter 1621 performs noise reduction. Coefficients for the IIR filter 1621 can be set, for example, using following Equations (8) to (10):

$$Cb(x,y)=0.25*Cb(x,y)+0.375*Cb(x,y-1)+0.375*Cb(x-1,y) \quad (8)$$

$$Cr(x,y)=0.25*Cr(x,y)+0.375*Cr(x,y-1)+0.375*Cr(x-1,y) \quad (9)$$

$$Y(x,y)=0.5*Y(x,y)+0.25*Y(x,y-1)+0.25*Y(x-1,y) \quad (10)$$

Cb(x, y) and Cr(x, y) are chrominance signals of a target pixel at coordinates (x, y) on the Nth line; and Y(x, y) is a luminance signal at the same coordinates (x, y). Cb(x, y−1) and Cr(x, y−1) are chrominance signals at coordinates (x, y−1) on the (N−1)th line, which is the line immediately preceding the Nth line where the target pixel is located; and Y(x, y−1) is a luminance signal at the same coordinates (x, y−1). Cb(x−1, y) and Cr(x−1, y) are chrominance signals on the Nth line at coordinates (x−1, y), which are coordinates immediately preceding the coordinates of the target pixel; and Y(x−1, y) is a luminance signal at the same coordinates (x−1, y).

The IIR filter 1621 sequentially reads YCbCr signals at coordinates (x, y−1) on the (N−1)th line and (x−1, y) on the Nth line from the line buffer 1623 and performs noise reduction filtering on the these signals and the YCbCr signals at coordinates (x, y) of the target pixel that are input. The thus-processed YCbCr signals are written to the line buffer 1623 and fed back to the IIR filter 1621 at future occasions when the target pixel is processed.

Figure 12:
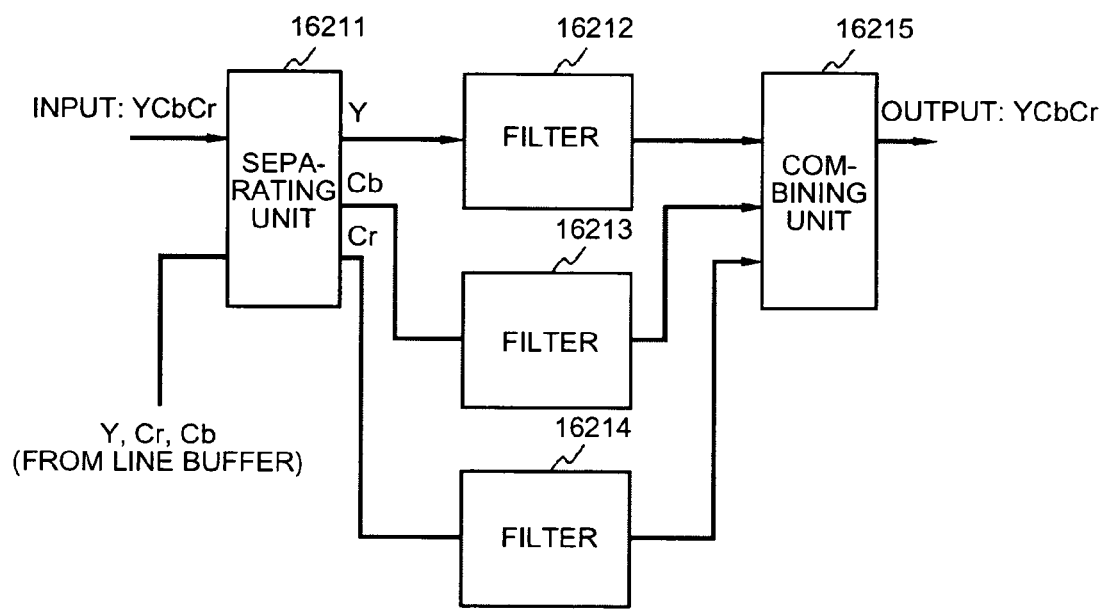
FIG. 12 is a block diagram illustrating the configuration of an IIR filter illustrated in FIG. 9.

FIG. 12 is a detailed configuration diagram of the IIR filter 1621. A separating unit 16211 separates each of the YCbCr signals that are input and the YCbCr signals that are fed back from the line buffer 1623 into Y, Cb, and Cr. A filter 16213, a filter 16214, and a filter 16212 perform filtering of the Cb signals, the Cr signals, and the Y signals by applying Equation (8), Equation (9), and Equation (10) thereto, respectively. Equations (8), (9), and (10) exert relatively strong noise suppression on the CbCr signals while the same exert relatively weak noise suppression on the Y signals. Note that Equations (8), (9), and (10) are given for illustration, and a configuration that performs no filtering on the Y signals can alternatively be employed. A combining unit 16215 combines the Cb, Cr, and Y signals having undergone the noise reduction together.

Figure 13:
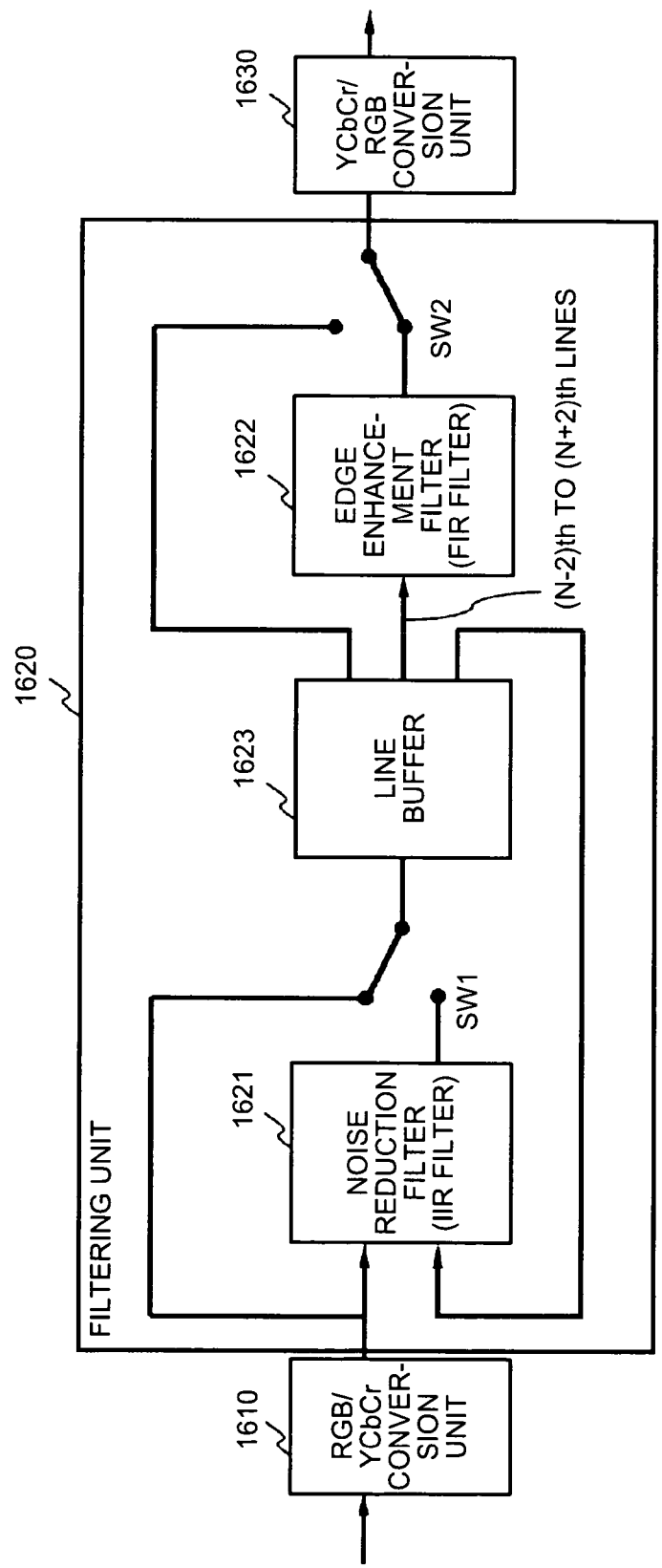
FIG. 13 is a block diagram illustrating how the IIR filter, a line buffer, and the FIR filter are connected together for a relatively low noise level.
Figure 14:
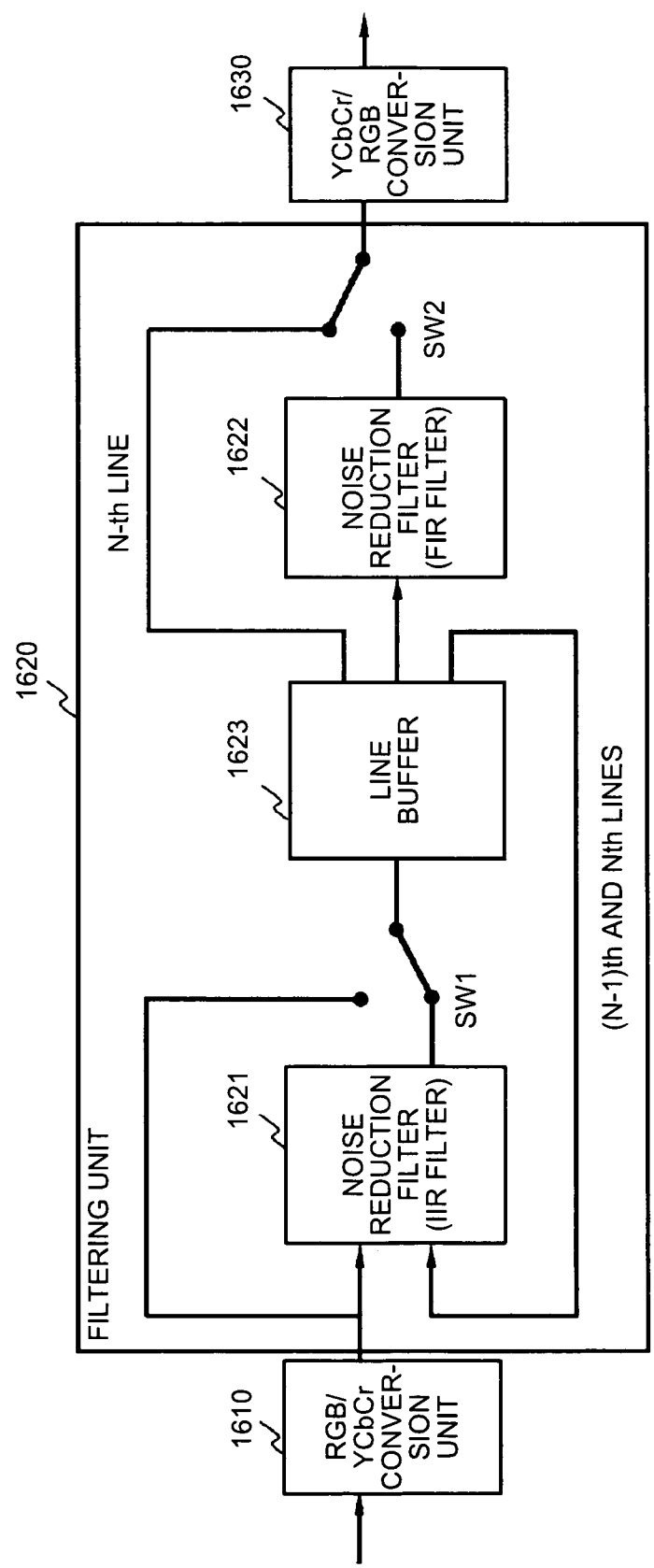
FIG. 14 is a block diagram illustrating how the IIR filter, the line buffer, and the FIR filter are connected together for a relatively high noise level.

Referring to FIG. 13 and FIG. 14, an overview of process procedure of the filtering unit 1620 will be described below.

FIG. 13 illustrates how the IIR filter 1621, the line buffer 1623, and the FIR filter 1622 are connected together for a case where a gain of the AGC circuit 120 is relatively low; i.e., a noise level of an image is relatively low. In this case, the IIR filter 1621 is disabled (output: open) and the FIR filter 1622 is enabled. The switch SW1 causes the YCbCr signals output from the RGB/YCbCr conversion unit 1610 to bypass the IIR filter 1621 to be sequentially written to the line buffer 1623. The FIR filter 1622 sequentially reads YCbCr signals of 5×5 pixels (pixels at coordinates (x−2, y−2) to (x+2, y+2)) on the (N−2)th to (N+2)th lines from the line buffer 1623 and uses Y signals of these signals to perform edge enhancement filtering of the luminance signal Y of the target pixel at coordinates (x, y) by applying coefficients given in FIG. 10 thereto. The YCbCr signals, of which Y signals having undergone the edge enhancement, are sequentially sent to the YCbCr/RGB conversion unit 1630 by way of the switch SW2 to be converted back into RGB signals.

FIG. 14 illustrates how the IIR filter 1621, the line buffer 1623, and the FIR filter 1622 are connected together in a case where the noise level in an image has increased due to an increase in gain of the AGC circuit 120. In this case, the IIR filter 1621 is enabled and the FIR filter 1622 is disabled (output: open).

The YCbCr signals (YCbCr signals at coordinates (x, y)) output from the RGB/YCbCr conversion unit 1610 are sequentially input to the IIR filter 1621. The processed YCbCr signals at coordinates (x, y−1) on the (N−1)th line and the processed YCbCr signals at coordinates (x−1, y) on the Nth line are sequentially read from the line buffer 1623 and fed back to the IIR filter 1621. The IIR filter 1621 receives an input of the YCbCr signals at coordinates (x, y) and the processed YCbCr signals at coordinates (x, y−1) and (x−1, y) fed back from the line buffer 1623, and performs noise reduction filtering of the YCbCr signals at coordinates (x, y) of the target pixel by using Equations (8), (9), and (10). The YCbCr signals having undergone the noise reduction are sequentially written to the line buffer 1623 by way of the switch SW1. Simultaneously, the line buffer 1623 sequentially reads the processed YCbCr signals at coordinates (x, y) and the processed YCbCr signals at coordinates (x, y−1) and coordinates (x−1, y). The YCbCr signals at coordinates (x, y) read out from the line buffer 1623 are sequentially sent to the YCbCr/RGB conversion unit 1630 by way of the switch SW2 while bypassing the FIR filter 1622 to be converted back into RGB signals. The YCbCr signals at coordinates (x, y−1) and (x−1, y) read out from the line buffer 1623 are fed back to the IIR filter 1621 to be used in noise reduction of a subsequent target pixel.

As mentioned earlier, depending on switching signals fed from the switching-signal generating unit 104 of the control unit 100, the filtering unit 1620 takes either the configuration illustrated in FIG. 13 (the IIR filter 1621 is disabled and the FIR filter 1622 is enabled), which is for a normal condition, to perform edge enhancement on luminance signals placing priority on resolution or the configuration illustrated in FIG. 14 (the IIR filter 1621 is enabled and the FIR filter 1622 is disabled), which is for a case where the noise level in an image has increased due to an increase in gain of the AGC circuit 120 in a dark portion or the like, to perform noise reduction of YCbCr signals. Meanwhile, the IIR filter 1621 performs feedback of the processed YCbCr signals by using a line buffer. Using the line buffer 1623, which is used by the FIR filter 1622, also as the line buffer for use in the feedback in a sharing manner eliminates the need of providing an additional line buffer for the IIR filter, leading to reduction in circuit scale.

Detection of a noise level of an image and generation of a switching signal will be described below. The noise-level detecting unit 102 of the control unit 100 employs, for example, one of the following methods of detecting a noise level of an image. As a matter of course, these are described for illustration only, and any method of detecting a noise level can be employed.

(i) Output signals of the imaging device 110 are amplified in the AGC circuit 120 prior to be subjected to A/D conversion performed by the A/D converter 130. A gain of the AGC circuit 120 is set to an appropriate value by making tradeoffs between a required lightness of an image frame and a noise level; however, when a decrease in lightness in a dark portion causes the gain to be a certain value or higher, the noise level undesirably increases to be equal to or above an allowable range. Specifically, when image capturing is performed with gain increased to increase sensitivity to a dark portion, noise becomes dominant in a captured image. By utilization of this fact, the noise-level detecting unit 102 can determine a noise level based on a gain of the AGC circuit 120.

(ii) Generally, the AGC circuit 120 controls its gain so as to maintain lightness of an image captured by the imaging device 110 constant. Therefore, average lightness is constant under a normal condition; however, if sensitivity is insufficient even when the gain is increased to its maximum value, average lightness of an image decreases. Therefore, whether a gain has reached its maximum value, i.e., whether a noise level has increased, can be determined by detecting average luminance of an image frame. By utilization of this fact, the noise-level detecting unit 102 can calculate, based on luminance signals Y obtained by the MTF correcting unit 160, average luminance of an image frame from a sum of luminance values taken across the entire image frame or, in some case, a sum of weighted luminance values, in which weights are assigned to signals corresponding to a subject at an image-frame center or the like, thereby determining a noise level.

(iii) Brightness is generally inversely proportional to a noise level. By utilization of this fact, an illuminance sensor can be provided so that the noise-level detecting unit 102 can determine a noise level based on an output of the illuminance sensor.

The switching-signal generating unit 104 generates switching signals based on a result of detection of the noise-level detecting unit 102. Specifically, when a noise level of an image is relatively low, switching signals that cause the switch SW1 to disable the IIR filter 1621 and the switch SW2 to enable the FIR filter 1622 are generated; in contrast, when the noise level is relatively high, switching signals that cause the switch SW1 to enable the IIR filter 1621 and the switch SW2 to disable the FIR filter 1622 are generated.

The embodiment of the present invention has been described. As a matter of course, the present invention can be implemented by configuring processing functions of the image processing apparatus illustrated in FIG. 1, or the like, as computer programs and causing a computer to execute the computer programs. Alternatively, the present invention can be implemented by configuring process procedure thereof as computer programs and causing a computer to execute the computer programs. The computer programs for causing a computer to carry out the processing functions can be stored and/or provided by recording the computer programs in a computer-readable recording medium, such as a flexible disk (FD), a magneto-optical disk (MO), a read only memory (ROM), a memory card, a compact disc (CD), a digital versatile disc (DVD), and a removable disk, and/or distributed via a network such as the Internet.

The invention claimed is:

1. An image processing apparatus that processes image data obtained by an imaging device, the image processing apparatus comprising:
   a line buffer that temporarily and sequentially stores therein the image data;
   a finite impulse response (FIR) filter that performs shaping of spatial frequency characteristics of the image data by using the line buffer;
   an infinite impulse response (IIR) filter that uses the same line buffer that is used by the FIR filter as a line buffer for use in feedback of processed image data;
   a noise-level detecting device that detects a noise level of the image data;
   a switching-signal generating device that generates a switching signal based on the noise level detected at the noise-level detecting device;
   at least one switching device configured to enable and disable the FIR filter and the IIR filter independently according to the switching signal generated at the switching-signal generating device, and
   wherein when a noise level is low, the switching device switches the IIR filter OFF so that an input signal is directly sent to the line buffer, while the switching device switches the FIR filter ON so that a signal sent from the FIR filter is sent to an output terminal, and when a noise level is high, the switching device switches the IIR filter ON so that a signal sent from the IIR filter is sent to the line buffer, while the switching device switches the FIR filter OFF so that a signal sent from the line buffer is directly sent to the output terminal.

2. The image processing apparatus according to claim 1, wherein the FIR filter is an edge enhancement filter that enhances high-frequency components of the image data.

3. The image processing apparatus according to claim 1, wherein the IIR filter is a low-pass filter that reduces noise.

4. The image processing apparatus according to claim 1, wherein the noise-level detecting device detects the noise level based on a gain of an automatic gain control (AGC) circuit of the image processing apparatus.

5. The image processing apparatus according to claim 1, wherein the noise-level detecting device detects the noise level based on average lightness of an image.

6. The image processing apparatus according to claim 1, wherein
   when the noise level is relatively low, the FIR filter is enabled and the IIR filter is disabled with an output terminal of the line buffer connected to an input terminal of the FIR filter, and
   when the noise level is relatively high, the FIR filter is disabled and the IIR filter is enabled with an output terminal of the IIR filter connected to an input terminal of the line buffer and the output terminal of the line buffer connected to an input terminal of the IIR filter.

7. An on-vehicle camera apparatus comprising:
   a wide-view-angle optical system;
   an imaging device that reads an image captured through the optical system;
   the image processing apparatus according to claim 1, wherein the image processing apparatus processes the image data captured by the imaging device; and
   a display device that displays image data processed by the image processing apparatus.

8. An on-vehicle camera apparatus comprising:
   a wide-view-angle optical system;
   an imaging device that reads an image captured through the optical system;
   the image processing apparatus according to claim 2, wherein the image processing apparatus processes the image data captured by the imaging device; and
   a display device that displays image data processed by the image processing apparatus.

9. An on-vehicle camera apparatus comprising:
   a wide-view-angle optical system;
   an imaging device that reads an image captured through the optical system;
   the image processing apparatus according to claim 3, wherein the image processing apparatus processes the image data captured by the imaging device; and
   a display device that displays image data processed by the image processing apparatus.

10. An on-vehicle camera apparatus comprising:
    a wide-view-angle optical system;
    an imaging device that reads an image captured through the optical system;
    the image processing apparatus according to claim 1, wherein the image processing apparatus processes the image data captured by the imaging device; and
    a display device that displays image data processed by the image processing apparatus.

11. An on-vehicle camera apparatus comprising:
    a wide-view-angle optical system;
    an imaging device that reads an image captured through the optical system;
    the image processing apparatus according to claim 4, wherein the image processing apparatus processes the image data captured by the imaging device; and
    a display device that displays image data processed by the image processing apparatus.

12. An on-vehicle camera apparatus comprising:
    a wide-view-angle optical system;
    an imaging device that reads an image captured through the optical system;
    the image processing apparatus according to claim 5, wherein the image processing apparatus processes the image data captured by the imaging device; and
    a display device that displays image data processed by the image processing apparatus.

13. An on-vehicle camera apparatus comprising:
    a wide-view-angle optical system;
    an imaging device that reads an image captured through the optical system;
    the image processing apparatus according to claim 6, wherein the image processing apparatus processes the image data captured by the imaging device; and
    a display device that displays image data processed by the image processing apparatus.

* * * * *